Sept. 11, 1956     A. C. WEISS     2,762,593
PALLET
Filed Feb. 24, 1954
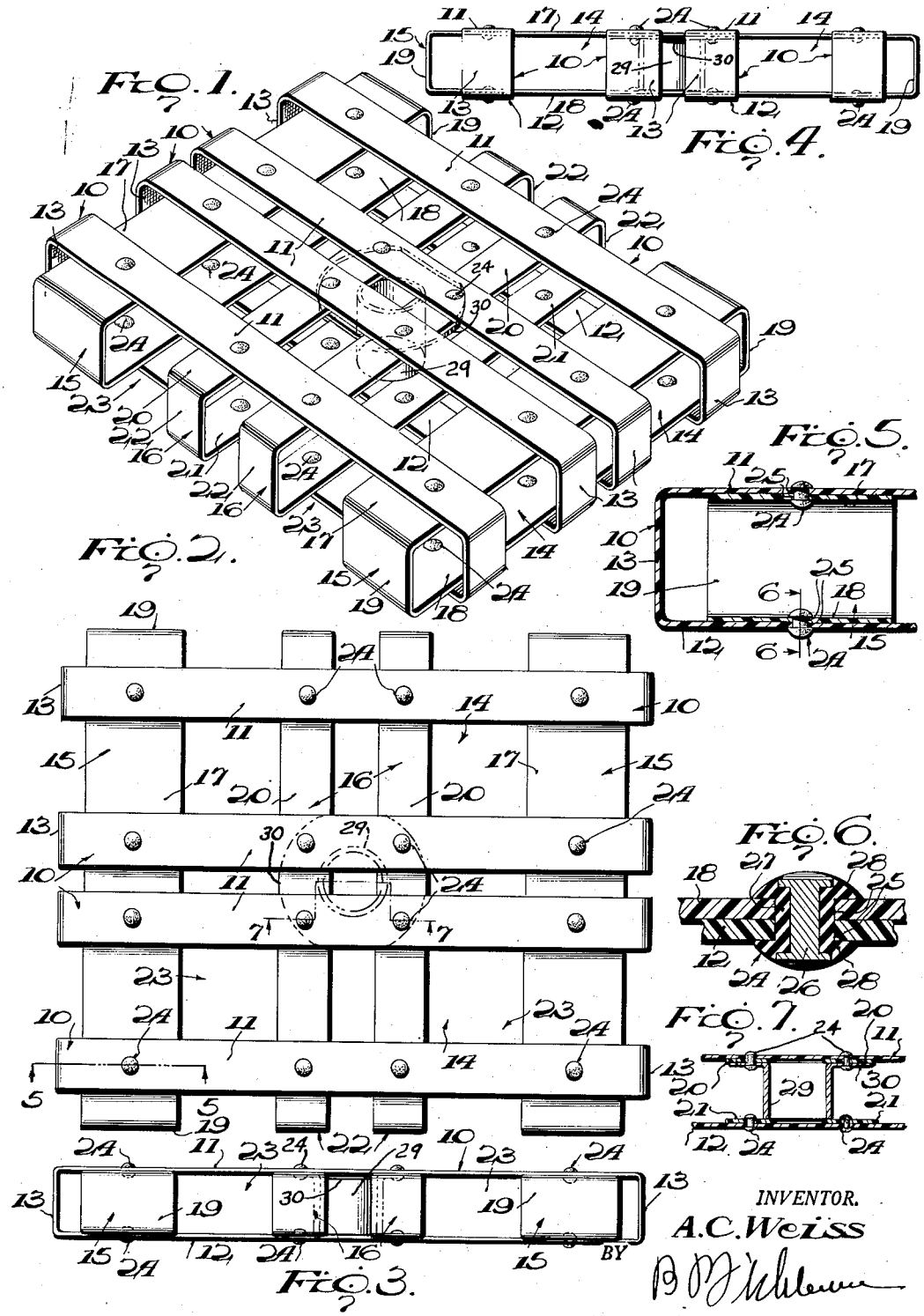
INVENTOR.
A. C. Weiss

United States Patent Office 2,762,593
Patented Sept. 11, 1956

2,762,593

PALLET

Alexander C. Weiss, Glassmanor, Md.

Application February 24, 1954, Serial No. 412,199

2 Claims. (Cl. 248—120)

My invention relates to a pallet for use in handling materials.

An important object of the invention is to provide an inexpensive, extremely light weight, sturdy and durable pallet for use in conjunction with fork lift trucks and the like, in materials handling operations.

A further object is to provide a four-way pallet of the above-mentioned character or one which may receive the lifting forks of the fork lift truck at any one of its four sides.

A further object is to provide a load supporting pallet which is extremely compact or flat in the vertical direction, so as to occupy a minimum space when stacked with other pallets during storage, return shipment and the like.

A further object is to provide a pallet constructed from a plurality of loops or frames of textile material, impregnated with a hardenable plastics material, or the like, rendering the loops or frames substantially rigid in assembly.

A still further object is to provide simplified means for securing the several loops or frames of the pallet together in assembly.

Other objects and advantages of the invention will be apparent during the course of the following description.

In the accompanying drawings, forming a part of this application, and in which like numerals are employed to designate like parts throughout the same, Figure 1 is a perspective view of a pallet embodying my invention, Figure 2 is a plan view of the same, Figure 3 is a side elevation of the pallet, Figure 4 is a further side elevation taken at right angles to Figure 3, Figure 5 is an enlarged fragmentary vertical section taken on line 5—5 of Figure 2, Figure 6 is an enlarged fragmentary vertical section taken on line 6—6 of Figure 5, and, Figure 7 is a fragmentary vertical section taken on line 7—7 of Figure 2.

In the drawings, where for the purpose of illustration is shown a preferred embodiment of my invention, the numeral 10 designates generally longitudinal frames or loops, which are elongated and generally rectangular in side elevation, as shown in Figure 3. Each loop 10 comprises elongated, flat top and bottom sides 11 and 12 of the same length, and these sides or loop portions are relatively narrow and may be quite thin in cross section, as shown. The loop sides 11 and 12 are preferably integrally connected with relatively short flat vertical or transverse end portions 13 of equal length, and having the same widths and thicknesses as the loop sides 11 and 12, and arranged at right angles to the loop sides 11 and 12.

Each longitudinal loop 10 of the pallet is preferably formed from a continuous section or band of fibrous material, such as unidirectional cotton matting, or the like, impregnated or saturated with a suitable hardenable plastics material, such as a phenolic-hycar resin, or the like. The loops 10, subsequent to being saturated with the hardenable plastics material are molded or shaped into the desired form, as shown in the drawings, and the plastics material is caused to harden or set by the application of heat and pressure, in a manner well known to those skilled in the art. Although the above description pertains to the use of a thermosetting type of plastics material as the bonding agent for the loops 10, it should be understood that the loops may be fabricated with other types of plastics materials as the hardening or bonding agents, such as plastics materials which will set at room temperature or colder, or even with certain well-known thermoplastic materials.

In any event, after the individual loops or bands 10 are shaped in the mold and bonded with the plastics material, they become relatively stiff or rigid and will retain their shapes shown in the drawings and described above. It should also be mentioned that other types of fibrous or textile materials than the unidirectional cotton matting referred to above may be employed for making the loops 10, if preferred, and these may include woven cotton fabric, such as heavy cotton duck or canvas, and certain types of woven or unwoven synthetic fibers such as fibers of glass, nylon and the like. However, I prefer to use unwoven unidirectional cotton matting, due to its relatively low cost, and its ability to absorb and hold relatively large quantities of the plastic bonding agent.

In the embodiment of the invention shown in the drawings, I employ four of the longitudinal loops or bands 10 above described, although it should be understood that a greater number or fewer of the loops may be used if preferred, and depending somewhat upon the overall dimensions of the desired pallet. As shown in the drawings, a pair of the loops or bands 10 are arranged in relatively close parallel spaced relation, near the transverse center of the pallet, and an additional pair of the loops 10 are spaced a substantial distance laterally of the central pair of loops 10, and near and somewhat inwardly of the longitudinal edges of the pallet. The outer pair of loops 10 are parallel with the central pair of loops 10, as shown. The space between the inner and outer pairs of longitudinal loops 10 provides a pair of longitudinal passages 14, extending entirely through the pallet in the lengthwise direction, and opening through the opposite ends of the pallet. The passages 14 are provided to accommodate the lifting forks of a conventional fork lift truck, and these lifting forks may enter the pallet from either pair of ends of the passages 14. As previously suggested, the vertical heights of the longitudinal loops 10, and of the transverse loops to be described, are only sufficient to accommodate conveniently the thickness of the lifting forks of the fork lift truck and the pallet is quite low and compact in the vertical direction. Because of this, a large number of the pallets may be conveniently stacked in a minimum space.

A plurality of transverse elongated loops or bands 15 and 16, similar to the longitudinal bands 10 are provided. The bands 15 and 16 are preferably somewhat shorter in their overall lengths than the bands 10, and the bands 16 are preferably of the same width as the bands 10, although the bands 15 are wider than the bands 10 and 16, as shown. The bands 15 which may be about twice as wide as the bands 10 and 16 are substantially rectangular in edge elevation, and include top and bottom sides 17 and 18 and ends 19 formed integral with the top and bottom sides 17 and 18 and arranged at right angles thereto. The top and bottom sides 17 and 18 of the transverse loops 15 are elongated and flat, as shown, and the ends 19 of the bands 15 are spaced laterally outwardly of the outer sides of the outermost pair of longitudinal loops 10 in assembly, as shown. The loops 15 and 16 are of equal lengths, as are the longitudinal loops 10, and the ends of all longitudinal and transverse loops are arranged in lateral alignment, so that the completely assembled pallet is rectangular.

The transverse loops 16 likewise include top and bottom sides 20 and 21 which are elongated and flat, and ends 22 arranged at right angles to the top and bottom sides 20 and 21, and preferably integrally secured thereto. As shown in the drawings, the pair of loops 16 are spaced apart a relatively slight distance near the longitudinal center of the pallet and are parallel, and arranged at right angles to the longitudinal loops 10. The loops 15 are spaced substantial distances laterally of the loops 16, and parallel therewith, and arranged near and inwardly of the ends of the longitudinal loops 10. Transverse passages 23 are thus formed between the pairs of transverse loops 15 and 16, and these passages extend entirely through the pallet in the transverse direction, and open through its longitudinal sides for receiving the lifting forks of the fork truck from either side of the pallet. The passages 23 intersect the passages 14, and are arranged at right angles thereto.

The loops or bands 15 and 16 are fabricated in the same manner as the loops 10, and preferably comprise continuous sections of unidirectional cotton matting, or the like, impregnated with a hardenable plastics material, such as phenolic-hycar resin, or the like. The other types of materials mentioned above as substitute materials for the loops 10 may, of course, be used to make the loops or bands 15 and 16, if preferred. When completed, the loops 15 and 16 are relatively rigid and stiff.

Although I have shown the two pairs of transverse loops 15 and 16 in my preferred form of pallet, it should be understood that a larger or smaller number of loops may be used if desired. The particular spacing or arrangement of the longitudinal or transverse loops 10, 15 and 16 above described, is mainly dictated by the desire to provide a rectangular pallet of standard dimensions in overall length and width, and one which may receive the lifting forks of the fork truck at any of its four sides. For this latter reason, the centermost pairs of longitudinal and transverse loops 10 and 16 are relatively closely spaced from each other, and relatively widely spaced apart from the endmost pairs of loops 10 and 15. The reason for making the endmost transverse loops 15 substantially twice as wide as the central pair of transverse loops 16, is to provide a rectangular pallet of greater overall length than overall width. Of course, if preferred, a pair of relatively narrow transverse loops may be substituted for each of the relatively wide transverse loops 15, but I prefer to employ equal numbers of longitudinal and transverse loops.

Although I do not wish to limit the invention to any particular dimensions, it might be mentioned that the pallet constructed as described above and shown in the drawings may be 48 inches long and about 40 inches wide. The individual longitudinal loops 10 may be about 4 inches wide, and this is likewise the preferred width of the transverse loops 16. The transverse loops 15 are preferably about 8 inches wide. The wall thickness of all of the loops 10, 15 and 16 is preferably about 3/16 of an inch, and this dimension may be varied, as found desirable. The overall vertical height or thickness of the pallet is preferably about 5½ inches, and this dimension is just sufficient to enable the passages 14 and 23 to receive the lifting forks of standard makes of fork lift trucks. All of the above dimensions are merely illustrative, and in no way critical, and they may be varied as found desirable.

As shown in the drawings, the transverse loops or bands 15 and 16 may extend through or inside of the longitudinal bands 10. The stop and bottom sides of the loops or bands 10, 15 and 16 are preferably in superposed contacting relation, in assembly. The longitudinal bands 10 may be flexed sufficiently to permit the insertion of the transverse bands 15 and 16 through them, although if preferred, the longitudinal bands 10 may be formed somewhat wider or deeper vertically to accommodate the transverse bands. Also, if preferred, the longitudinal bands 10 may extend inside of or through the transverse bands 15 and 16, and the preferred construction in this respect is entirely optional.

Means are provided for securing the longitudinal and transverse loops or bands 10, 15 and 16 together in assembly. Such means comprises a plurality of headed fastener elements or grommets 24, engaging through registering openings 25 in the top and bottom sides or walls of the longitudinal and transverse loops 10, 15 and 16, at all of the crossing points or interstices of the transverse and longitudinal loops. Each grommet 24 preferably embodies an internal core 26 of steel or the like, and an outer covering or shell 27 of rubber, synthetic rubber or the like, preferably having a hardness of about 60 durometer. The grommets 24 are formed to provide rubber heads 28, integral therewith, and reinforced by the headed ends of the steel pores 26, as best shown in Figure 6. The grommets 24 preferably have a snug fit within the openings 25, and the heads 28 serve to clamp the adjacent superposed top or bottom walls of the longitudinal and transverse loops together fairly tightly in assembly. The use of rubber grommets for securing the longitudinal and transverse loops together forms a pallet which may yield slightly at its points of connection, thus relieving strains, and absorbing shocks and impact. The grommets 24 are readily removable and replaceable, as are all of the longitudinal transverse loops 10, 15 and 16.

The pallet constructed as above is extremely tough and durable, and capable of supporting heavy loads. The assembled pallet is very rigid, and there are no sharp corners or projections. No nails, screws or like metal fastener elements are employed in the construction of the pallet, and this renders the pallet further free of sharp points or projections, likely to cut a person handling the pallet. The arrangement of the grommets 24 at all crossing points of the longitudinal and transverse loops, on the top and bottom sides of the pallet locks the loops securely together in assembly, and prevents pivoting or canting of any of the individual loops.

In order to render the pallet more rigid, and to prevent sagging or deflection of the top or bottom walls near the center of the pallet, I provide a rigid spacer sleeve 29 at the center of the pallet, extending between its top and bottom walls, at right angles thereto. The spacer sleeve 29 has its lower end contacting the lower sides 21 of the center pair of bands 16, Figure 7, and its top end is provided with a substantially annular flat flange 30, integral therewith, and contacting the bottoms of the upper sides 20 of the center pair of bands 16. The flange 30 is apertured at circumferentially equidistantly spaced points to receive the four grommets 24 at the top side of the pallet, where the center pair of bands 10 and the bands 16 cross, Figure 2. The grommets 24 at the center of the pallet thus extend through the band sections 11 and 20, and through the sleeve flange 30, as shown in Figure 7, and the grommets serve to secure the spacer sleeve to the top wall of the pallet and to hold it against movement. The lower end of the spacer sleeve 29 may be unattached to the pallet, as shown.

If preferred, the flange 30 may be attached to the top wall of the pallet by means of one diagonal pair only of the grommets 24 at the center of the pallet.

It is to be noted that the pallet, due to its low flat construction, and due to the fact that its top and bottom sides are identical or symmetrical is reversible, and care need not be taken to arrange a particular side of the pallet uppermost, during the use of the same.

It is to be understood that the form of the invention herewith shown and described is to be taken as a preferred example of the same, and that various changes in the shape, size and arrangement of parts may be resorted to, without departing from the scope of the invention, or scope of the subjoined claims.

Having thus described my invention, I claim:

1. A pallet comprising a first group of spaced substantially parallel continuous elongated integral loops, each loop of the first group being formed of fibrous material having substantial width impregnated with a hardened plastic material and being substantially stiff, each loop of the first group including top and bottom parallel sides and ends extending at right angles to the sides and having rounded corners at the junctures of the sides and ends, each loop of the first group thereby being substantially rectangular and narrow in the direction between its top and bottom sides, the combined widths of the loops of said first group making up a major portion of the overall width of the pallet in one direction, a second group of spaced substantially parallel continuous elongated integral loops, each loop of the second group formed of fibrous material having substantial width impregnated with a hardened plastic material and being substantially stiff, each loop of the second group including top and bottom parallel sides and ends extending at right angles to the sides and having rounded corners at the junctures of the sides and ends, each loop of the second group thereby being substantially rectangular and narrow in the direction between its top and bottom sides, the combined widths of the loops of the second group constituting a major portion of the overall width of the pallet in the other direction, the loops of the second group extending substantially at right angles to and crossing the loops of the first group, and means securing the loops of the first and second groups together in assembly.

2. A pallet comprising a first group of spaced substantially parallel elongated loops, each loop of the first group being formed of fibrous material having substantial width impregnated with a hardened plastic material and being substantially stiff, each loop of the first group including top and bottom substantially parallel sides and ends connecting the sides, each loop of the first group being relatively narrow in the direction between its top and bottom sides and elongated longitudinally of its sides, the combined widths of the loops of the first group making up a major portion of the overall width of the pallet in one direction, a second group of spaced substantially parallel elongated loops, each loop of the second group formed of fibrous material having substantial width impregnated with a hardened plastic material and being substantially stiff, each loop of the second group including top and bottom substantially parallel sides and ends connecting said sides, each loop of the second group being relatively narrow in the direction between its sides and elongated longitudinally of said sides, the combined widths of the loops of the second group constituting a major portion of the overall width of the pallet in the other direction, the loops of the second group extending substantially at right angles to and crossing the loops of the first group, and means securing the loops of the first and second groups together in assembly.

References Cited in the file of this patent

UNITED STATES PATENTS

| | | |
|---|---|---|
| 1,334,409 | Sindelar | Mar. 23, 1920 |
| 1,801,835 | Andrews | Apr. 21, 1931 |
| 2,450,848 | Wisberger | Oct. 4, 1948 |
| 2,487,687 | Arthur et al. | Nov. 8, 1949 |
| 2,662,710 | Lapham | Dec. 15, 1953 |

FOREIGN PATENTS

| | | |
|---|---|---|
| 577,565 | Great Britain | May 23, 1946 |